United States Patent
Kawaguchi et al.

(10) Patent No.: US 7,508,426 B2
(45) Date of Patent: Mar. 24, 2009

(54) IMAGE PICKUP DEVICE, AND DRIVING CONTROLLING METHOD FOR SOLID-STATE IMAGING DEVICE

(75) Inventors: Shunji Kawaguchi, Kanagawa (JP); Daisuke Koyanagi, Kanagawa (JP); Azusa Takahashi, Kanagawa (JP)

(73) Assignee: Sony Corporation (JP)

( * ) Notice: Subject to any disclaimer, the term of this patent is extended or adjusted under 35 U.S.C. 154(b) by 648 days.

(21) Appl. No.: 11/108,737

(22) Filed: Apr. 19, 2005

(65) Prior Publication Data
US 2005/0253938 A1 Nov. 17, 2005

(30) Foreign Application Priority Data
May 17, 2004 (JP) .............................. 2004-146771
Feb. 16, 2005 (JP) .............................. 2005-039496

(51) Int. Cl.
*H04N 5/262* (2006.01)
(52) U.S. Cl. ................................. 348/240.1
(58) Field of Classification Search ............. 348/240.1, 348/240.2, 240.3, 240.99
See application file for complete search history.

(56) References Cited

U.S. PATENT DOCUMENTS

| | | | | |
|---|---|---|---|---|
| 5,966,174 | A * | 10/1999 | Yamamoto et al. | 348/319 |
| 6,526,234 | B1 * | 2/2003 | Malloy Desormeaux | 396/374 |
| 6,650,368 | B1 * | 11/2003 | Doron | 348/240.2 |
| 7,006,764 | B2 * | 2/2006 | Brost | 396/380 |
| 2002/0101529 | A1 * | 8/2002 | Tanizoe et al. | 348/333.01 |
| 2004/0130642 | A1 * | 7/2004 | Imamura et al. | 348/311 |
| 2005/0253938 | A1 * | 11/2005 | Kawaguchi et al. | 348/240.1 |

FOREIGN PATENT DOCUMENTS

| | | | |
|---|---|---|---|
| JP | 01-157678 | * | 6/1989 |
| JP | 2001-157678 | | 6/1989 |

(Continued)

OTHER PUBLICATIONS

Japanese Office Action dated May 29, 2008 for corresponding Japanese Application No. 2004-146771.

*Primary Examiner*—Tuan V Ho
*Assistant Examiner*—Kent Wang
(74) *Attorney, Agent, or Firm*—Rader Fishman & Grauer PLLC; Ronald P. Kananen

(57) ABSTRACT

The present invention provides an image pickup device including a zoom function not using any optical means and capable of correcting a signal from a defective pixel based on positional information for the defective pixel previously stored therein. According to the present invention, the image pickup device realizing a zoom function by enlarging a portion of an image picked up with a solid-state imaging device including: a zoom ratio accepting unit configured to accept an input with a zoom ratio of N (N·1); and a timing signal generating unit generate timing for driving the solid-state imaging device so that signal charges for horizontal lines included in a required area for the zoom ratio of N among horizontal lines on an acceptance surface of the solid-state imaging device are intermittently transferred once for N horizontal scan periods within a vertical effective period and signal charges for horizontal lines included in an upper unnecessary area corresponding to an section above the image surface from the necessary area are transferred at a high speed just before the vertical effective period.

10 Claims, 9 Drawing Sheets

FOREIGN PATENT DOCUMENTS

| | | |
|---|---|---|
| JP | 01-170280 | 7/1989 |
| JP | 06-303530 | 10/1994 |
| JP | 08-237550 | 9/1996 |
| JP | 09-284630 | 10/1997 |
| JP | 09-307806 | 11/1997 |
| JP | 63-257388 | 10/1998 |

* cited by examiner

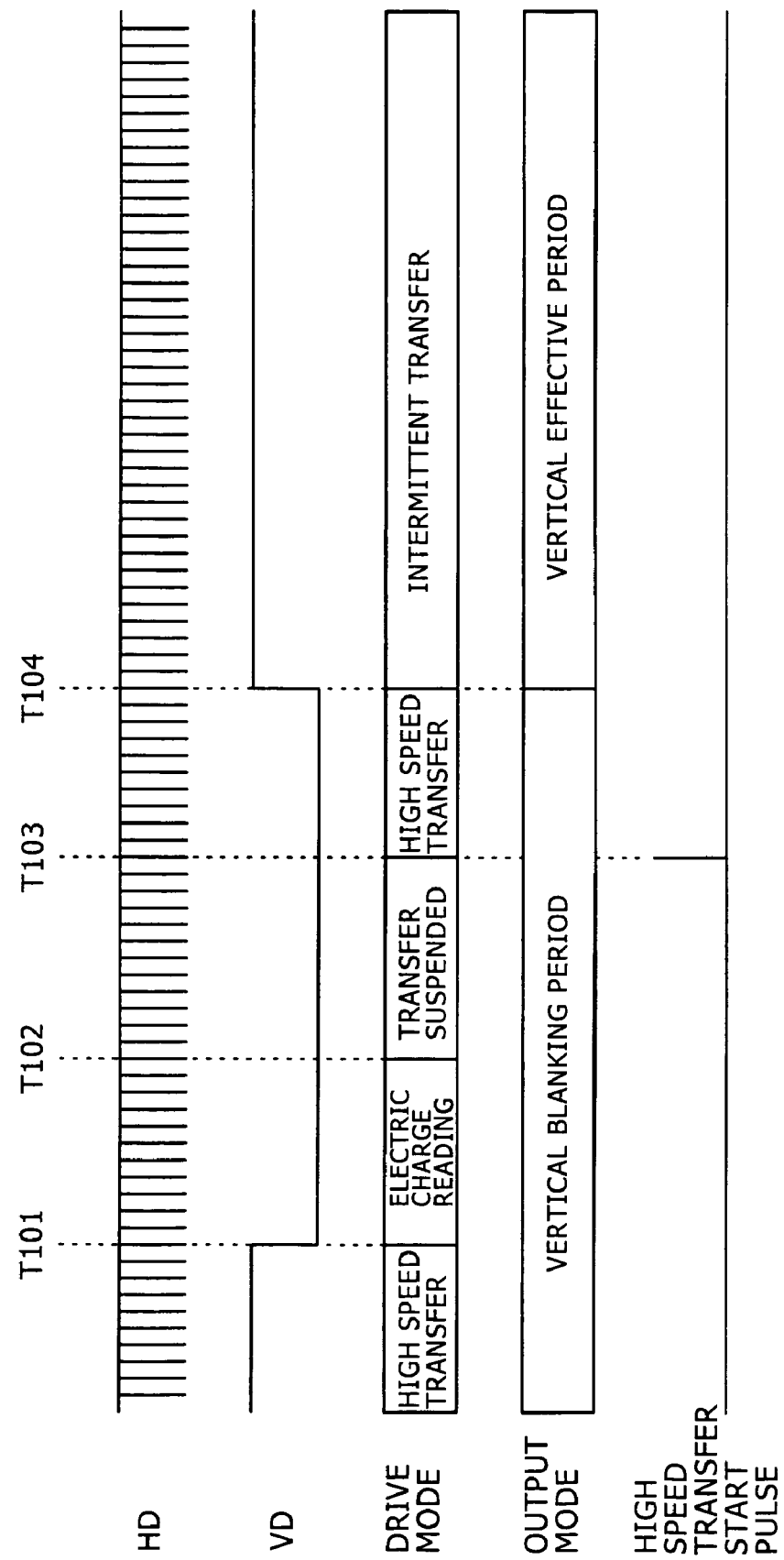

IMAGE PICKUP DEVICE, AND DRIVING CONTROLLING METHOD FOR SOLID-STATE IMAGING DEVICE

BACKGROUND OF THE INVENTION

The present invention relates to an image pickup device using a solid-state imaging device and a driving controlling method for the solid-state imaging device. More specifically, this invention relates to an image pickup device realizing the zoom function for enlarging a portion of an image picked up with a solid-state imaging device and a driving controlling method for the solid-state imaging device.

Recently a digital still camera or a digital video camera using therein a solid-state imaging device such as a CCD (Charge Coupled Device) has been popularized, and most of the image pickup devices as described above have the zoom function. As a method of realizing the zoom function, there have been known a method of using an optical lens moving mechanism and another method not using the lens moving mechanism, and in a method categorized as belonging to the latter type, a zoom ratio of N times is achieved with a solid-state imaging device based on the interline transfer system by intermittently transferring a signal charge for each pixel in an area to be enlarged within an acceptance surface once for N horizontal scan periods (N·1) (Refer to, for instance, Japanese Patent Laid-Open No. hei 1-157678 (page 5 to page 9, FIGS. 1 to 4)).

FIG. 9 is a timing chart showing timing for driving a CCD when the method described above is employed.

In a CCD based on the interline transfer system, a number of photoreceptor sections each carrying out photoelectric conversion are arranged in the matrix form, and a vertical transfer register is positioned to each of the photoreceptor sections arrayed in a row, and each vertical transfer register is connected to one horizontal transfer register. Signal charges transferred from the photoreceptor sections to corresponding vertical transfer registers are successively transferred by the horizontal transfer registers line by line.

In order to realize the N times zoom function with the CCD and without using any optical means, a portion of a central area of a photoreceptor surface is used as an enlarged area, and the CCD is driven at the timing as shown in FIG. 9 according to a horizontal drive (HD) signal and a vertical drive (VD) signal. Namely, in a vertical blanking period, signal charges for all photoreceptor sections are drained (timing T301 to T302), and then signal charges for an unnecessary area in the upper edge section of the photoreceptor surface of the CCD are transferred at a high speed for discharging (timing T302 to T303). Next, signal charges for a necessary area in the vertical direction are intermittently transferred at a speed of 1/N against the horizontal synchronism in a vertical effective period starting from the timing T304. In the vertical effective period, unnecessary charges in the right and left edge sections of the photoreceptor surface are aborted. With the image signals outputted according to the drive timing as described above, an image corresponding to the enlarged area on the photoreceptor surface is magnified by N times, so that a zoom image magnified N times can be obtained without using any optical means.

With the solid-state imaging device based on the interline transfer system, however, when a potential gap is present in a charge transfer area of a vertical transfer register, a pixel corresponding to this position disadvantageously becomes a defective pixel (black point). To solve the problem as described above, there has been proposed a solid-state image pickup device in which an electric charge can be injected from a drain area of a vertical transfer register to a vertical transfer register to drain unnecessary charges to the drain area, then the charge injected from the drain area is transferred to a horizontal transfer register, and then a charge comprising signal charges from the photoreceptor section is read into the vertical transfer register (Refer to, for instance, Japanese Patent Laid-Open No. Sho 63-257388 (page 505, FIG. 7)). Further, there has been used more commonly the method in which a structure of a solid-state imaging device is not changed as described above, and also in which a position of a defective pixel is previously stored in a memory and a signal from the defective pixel included in an output image signal from the solid-state imaging device is interpolated with signals from pixels around the defective pixel.

When the zoom function is realized by driving a CCD as shown in FIG. 9, the vertical blanking period and a vertical effective period are fixed according to an output frame rate for am image pickup signal (for instance 30 frames/sec), and further a transfer frequency for high speed transfer of signal charges from an unnecessary area is basically kept constant, and therefore when the zoom ratio is, for instance, 1.2 and the number of lines to be drained by means of high speed transfer, a transfer suspended period generated in the time frame from timing T303 to T304 becomes longer. During this transfer suspended period, signal charges are accumulated in a vertical transfer register, so that, when the defect due to a potential gap as described above is present in the vertical transfer register, a pixel corresponding to the defective position becomes a defective pixel.

Because the number of lines transferred at a high speed in the time frame from timing T302 to timing T303 changes according to a zoom ratio, positions of defective pixels generated in the entire image during the transfer suspended period change according to the zoom ratio. Because of this problem, positions of the defective pixels can not previously be stored in a memory, and the method of interpolating each of the defective pixels with signals from pixels around the pixel can not be employed, which is disadvantageous.

SUMMARY OF THE INVENTION

The present invention was made in the light of the circumstances as described above, and is desirable to provide an image pickup device having the zoom function not using any optical means in which signal correction for defective pixels can be carried out based on positional information for defective pixels previously stored therein.

It is desirable for the present invention to provide a driving controlling method for a solid-state imaging device capable of realizing the zoom function not using any optical means and carrying out signal correction for defective pixels based on positional information for the defective pixels previously stored for an output signal.

To solve the problems as described above, the present invention provides an image pickup device capable of realizing the zoom function by enlarging a partial area of an image picked up with a solid-state imaging device and including a zoom ratio accepting unit configured to accept an input with a zoom ratio of N (N·1), and a timing signal generating unit configured to generate timing for driving the solid-state imaging device so that signal charges for horizontal lines included in a required area for the zoom ratio of N among horizontal lines on a photoreceptor surface of the solid-state imaging device are intermittently transferred once for N horizontal scan periods within a vertical effective period and signal charges for horizontal lines included in an upper unnecessary area corresponding to a section above the image surface from the necessary area are transferred at a high speed just before the vertical effective period.

With the image pickup device as described above, because the signal charges for the upper unnecessary area are drained at a high speed during a vertical blanking period and then signal charges for horizontal lines included in a necessary area are intermittently transferred once for N horizontal scan periods within a vertical effective period, a signal for an image of a required area magnified N times can be obtained. In this step, intermittent transfer of signal charges for horizontal lines included in the necessary area is started just after signal charges for the upper unnecessary area are transferred at a high speed, a period during which charge transfer in a vertical register on a solid-state imaging device is suspended is not generated between the two time frames above, and the transfer suspended period is generated before electric charges for the upper unnecessary area are transferred. Because of this feature, a position of a defective pixel generated during the transfer suspended period due to a defect of a vertical register is always kept at the same position regardless of the zoom ratio N.

Further the present invention provides a driving controlling method for a solid-state imaging device for realizing the zoom function by enlarging a partial area of an image picked up with the solid-state imaging device in which the zoom ratio accepting unit accepts an input of a zoom ratio N (N·1); and the timing signal generating unit generates the timing for driving the solid-state imaging device by intermittently transferring signal charges for horizontal lines included in a necessary area corresponding to the zoom ratio N among horizontal lines on a photoreceptor surface of the solid-state imaging device once for N horizontal scan periods within a vertical effective period so that signal charges for horizontal lines included in an upper unnecessary area corresponding to a section above an image surface from the necessary area at a high speed for draining just before start of the vertical effective period.

In the driving controlling method for a solid-state imaging device as described above, signal charges for an upper unnecessary area is drained at a high speed during a vertical blanking period, and then signal charges for horizontal lines included in the necessary area are intermittently transferred once for N horizontal scan periods within a vertical effective period, and thereby a signal for an image with the necessary area magnified N times is obtained. In this step, intermittent transfer of signal charges for horizontal lines included in the necessary area is started just after signal charges for the upper unnecessary area are transferred at a high speed, a period during which charge transfer in a vertical register on a solid-state imaging device is suspended is not generated between the two time frames above, and the transfer suspended period is generated before electric charges for the upper unnecessary area are transferred. Because of this feature, a position of a defective pixel generated during the transfer suspended period due to a defect of a vertical register is always kept at the same position regardless of the zoom ratio N.

With the present invention, a position of a defective pixel due to a potential gap in a vertical register is always kept at the same position regardless of a zoom ratio N, and therefore it is possible to previously store positional information for a defective pixel due to the cause described above and correct a signal for the defective pixel by interpolation with signals from pixels around the defective pixel, and therefore the zoom function ensuing high image quality can be realized at a low cost without using any optical means.

BRIEF DESCRIPTION OF THE DRAWINGS

FIG. 4 is a timing chart showing the timing for driving the CCD when the digital zoom function is employed in the image pickup device according to the first embodiment of the present invention;

DETAILED DESCRIPTION OF THE PREFERRED EMBODIMENTS

Embodiments of the present invention are described in detail below with reference to the drawings.

First Embodiment

Figure 1:
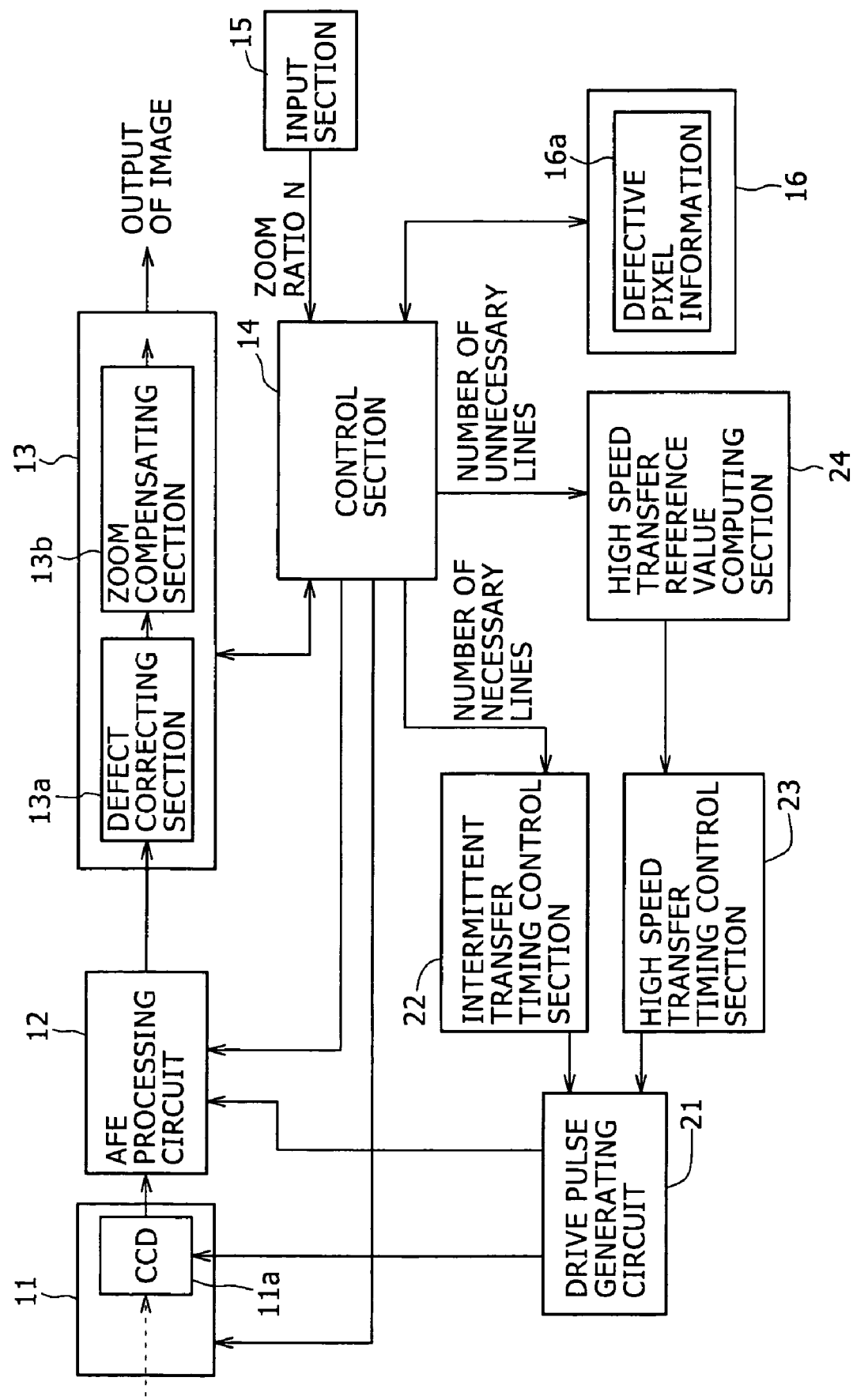
FIG. 1 is a block diagram showing configuration of a key section of an image pickup device according to a first embodiment of the present invention.

FIG. 1 is a block diagram showing configuration of a key section of an image pickup device according to a first embodiment of the present invention.

The image pickup device shown in FIG. 1 is a device for converting a signal for a still image picked up with a solid-state imaging device to digital data for the purpose to display the image based on the signal on a monitor not shown or to record the image in a recording medium. The image pickup device having the configuration as described above is realized as an image pickup function for a portable type information processor such as a digital still camera, a digital video camera, a mobile telephone or a PDA (Personal Digital Assistance).

The image pickup device includes, as shown in FIG. 1, an optical block 11, an analog front end (AFE) processing circuit 12, a camera signal processing circuit 13, a control section 14, an input section 15, and an EEPROM (Electronically Erasable and Programmable ROM) 16. The image pickup device further includes, for generating the timing for driving a CCD 11a in the optical block 11, a drive pulse generating circuit 21, an intermittent transfer timing control section 22, a high speed timing control section 23, and a high speed transfer reference value computing section 24.

The optical block 11 includes an optical lens not shown or a shutter, an iris, and a CCD 11a subjecting the light from an object having passed through the components above to photoelectric conversion. Operations of the shutter and iris are controlled by the control section 14, and the CCD 11a is driven according to a timing pulse generated by the drive pulse generating circuit 21. In this embodiment, the CCD 11a based on the interline transfer system is used, and, by intermittently transferring image signals for a portion of a photoreceptor surface of this CCD 11a, the zoom function (described as a digital zoom function hereinafter) is realized.

The AFE processing circuit 12 carries out sample holding to an analog image signal outputted from the CCD 11a by the CDS (Correlated Double Sampling) processing to preserve the S/N (Signal/Noise) ratio in the good state, and further controls a gain by means of the AGC (Auto Gain Control) processing, and executes A/D conversion to output a digital image signal.

The camera signal processing circuit 13 is a block for carrying out various types of camera signal processing to image data from the AFE processing circuit 12, and especially in this embodiment, the camera signal processing circuit 13 includes a defect correcting section 13a for correcting a signal from a defective pixel and a zoom interpolating section 13b for generating a digital zoom image.

The defect correcting section 13a outputs, of digital image signals outputted from the AFE processing circuit 12, those from defective pixels and those around the defective signals respectively to the control section 14. Then the signals from the defective pixels having been subjected to interpolation by the control section 14 are substituted by the original signals.

The zoom interpolating section 13b is actuated when the zoom ratio N for digital zoom is set to a value larger than 1, and aborts pixel signals included in the unnecessary area in the horizontal direction from output image signals from the defect correcting section 13a based on information concerning the zoom ratio for digital zoom received from the control section 14, then sequentially outputs pixel signals for a plurality of lines, and receives the interpolated signals to generate a signal for an image enlarged according the zoom ratio N.

In the camera signal processing circuit 13, further various types of camera signal processing such as the AWB (Auto White Balance) processing, AF (Auto Focus) processing, AE (Auto Exposure) processing are carried out to the output image signals from the zoom interpolating section 13b, and the processed image signals are sent to a graphic interface (not shown) for having the picked-up image shown on a monitor or to an encoder (not shown) based on a compressed encoding system or the like.

The control section 14 is a circuit configured to comprehensively control various components of this image pickup device, and for instance, is realized as a microcomputer having a CPU and a ROM or a RAM. Further the control section 14 receives a control signal corresponding to an input operation by a user from the input section 15 having an input key or the like. Further the EEPROM 16 is connected to the control section 14, and various types of programs executed by the control section 14, or data required for processing and the like are stored in the EEPROM 16.

The control section 14, controls the optical block 11, AFE processing circuit 12, camera signal processing circuit 13 and other related sections based on an output image signal from the zoom interpolating section 13b or various set values to obtain a desired exposure. Further the control section 14 reads out defective pixel information 16a stored in the EEPROM 16, outputs defective position information to the defect position correcting section 13a, and executes signal interpolation for defective pixels using an image outputted from the defect correcting section 13a corresponding to the output.

The defect position correcting section 13a may detect a new defective pixel from an image signal outputted from the CCD 11a at prespecified timing after the shipment, for instance, upon power turned ON, under control by the control section 14, and store a position of the detected defective pixel in defective pixel information 16a. In this case, when an image is picked up, by executing correction of the defect with the defect position correcting section 13a based on the updated defective pixel information 16a, also a defective pixel on the CCD 11a generated anew after shipment can be corrected, so that the image quality can be preserved.

Further in this embodiment, especially the number of lines in a necessary area and an unnecessary area of an image picked up by the CCD 11a or the like are computed based on the digital zoom ratio N specified in response to an input operation such as an entry with the zoom key in the input section 15, and the computed numbers are outputted to the intermittent transfer timing control section 22 as well as to the high speed transfer reference value computing section 24 so that the high speed transfer and intermitted transfer are executed from the CCD 11a. In addition, the defect position correcting section 13a executes the processing for interpolation using a pixel signal supplied from the zoom interpolating section 13b to generate a signal for an image with a required area enlarged therein.

The high speed transfer reference value computing section 24 receives the number of lines in the unnecessary area corresponding to the zoom ratio N, computes a period of time required for transferring the pixel signals for the unnecessary area at a high speed as a count number for horizontal synchronism, and outputs the count number to the high speed timing control section 23. The function of the high speed transfer reference value computing section 24 may be realized with the control section 14. The high speed timing control section 23 gives a pulse indicating the timing for starting the high speed transfer to the drive pulse generating circuit 21 based on the count number from the high speed transfer reference value computing section 24.

On the other hand, the intermittent transfer timing control section 22 receives the number of lines in the necessary area corresponding to the zoom ratio N from the control section 14, and gives the timing for starting intermittent transfer of pixel signals for the necessary area and a pulse indicating the synchronous timing for the intermittent timing to the drive pulse generating circuit 21. Then the drive pulse generating circuit 21 outputs various types of drive pulses for driving the CCD 11a according to the output pulses from the intermittent transfer timing control section 22 as well as from the high speed timing control section 23.

Figure 2:
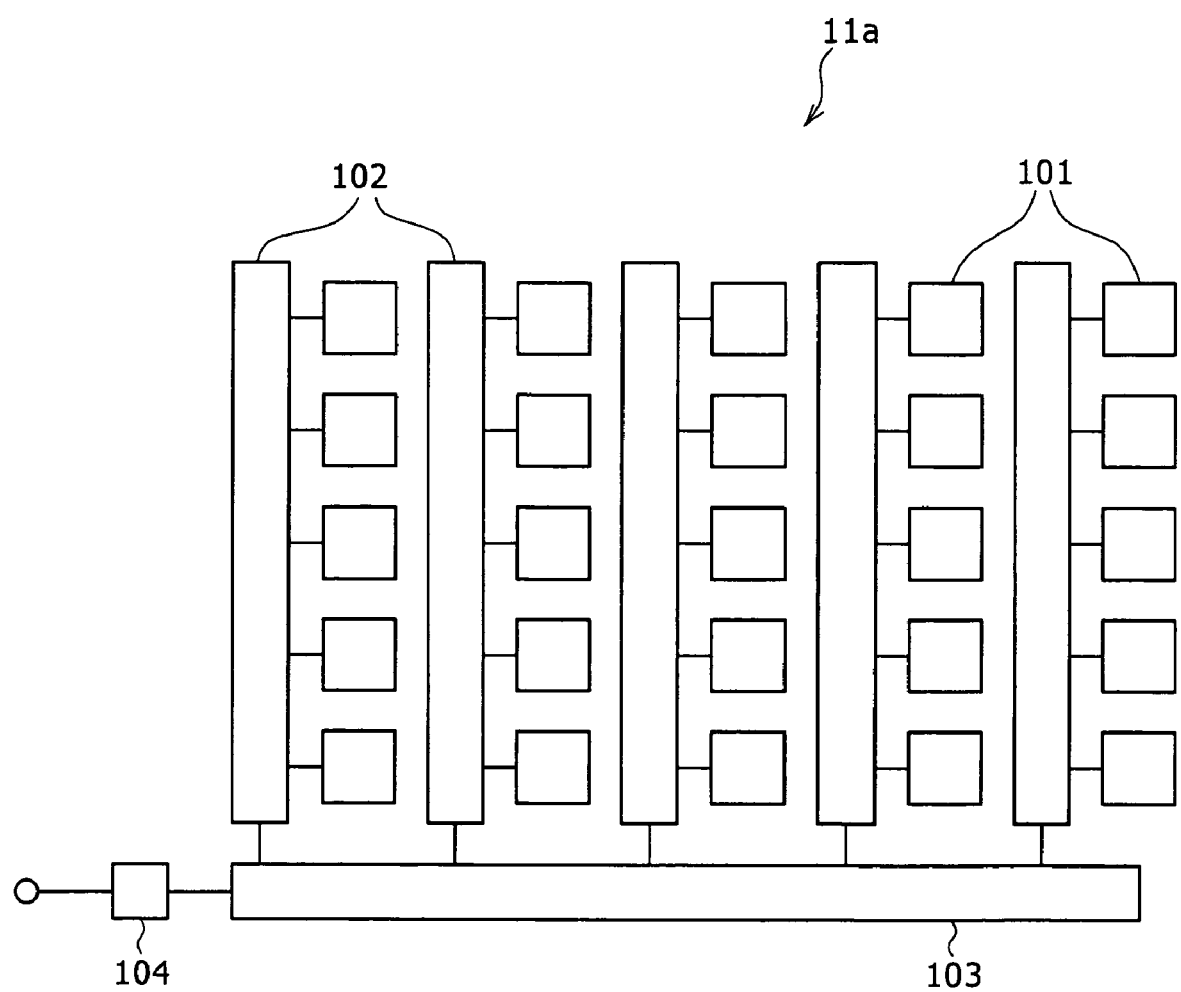
FIG. 2 is a view schematically showing a structure of a CCD based on the interline transfer system.

FIG. 2 is a view schematically showing a structure of the CCD 11a based on the interline transfer system.

As shown in FIG. 2, the photoreceptor sections 101 are provided in the matrix form along a number of rows and lines in the vertical direction and in the horizontal direction respectively, and vertical transfer sections 102 are provided for the lines respectively with the vertical transfer sections 102 connected to the horizontal transfer sections 103 respectively. Further an output section 104 for outputting a pixel signal to outside is connected to the horizontal transfer section 103.

A photo diode is provided in the photoreceptor section 101, and an electric charge is accumulated therein according to intensity of light coming into the photoreceptor surface through the optical block 11 as well as to a period of time of exposure. The photoreceptor section 101 transfers the accumulated electric charge to the vertical transfer section 102 in response to a drive pulse signal from the drive pulse generating circuit 21.

The vertical transfer section 102 receives the electric charge transferred from the photoreceptor section 101 connected thereto, and transfers the electric charge for each pixel to the horizontal transfer section 103 one by one sequentially in response to a drive pulse signal from the drive pulse generating circuit 21. The horizontal transfer section 103 transfers the electric charges received for the lines from the vertical transfer sections 102 line by line sequentially to the output section 104. With the operations, a pixel signal is sequentially outputted line by line.

When the digital zoom is performed, only the digital charges on the photoreceptor sections 101 included in the necessary area on the photoreceptor surface corresponding to the zoom ratio N are used, and those for other photoreceptor sections 101 are aborted.

FIG. 3 is a view for illustrating enlargement of an image by means of digital zoom.

Figure 3A:
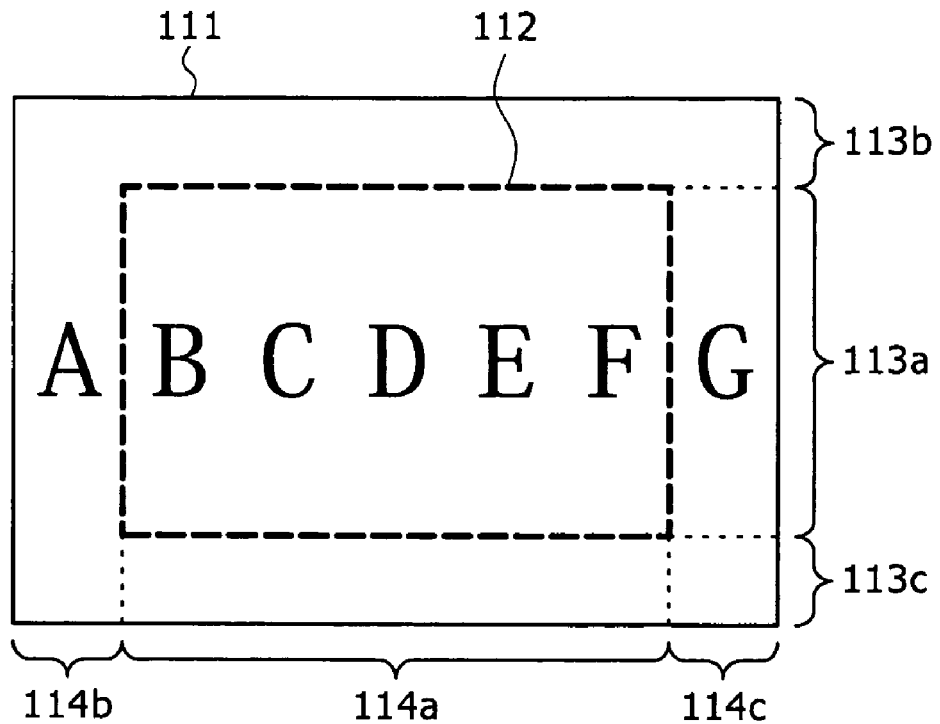
FIGS. 3A and 3B are views for illustrating enlargement of an image by means of digital zoom.
Figure 3B:
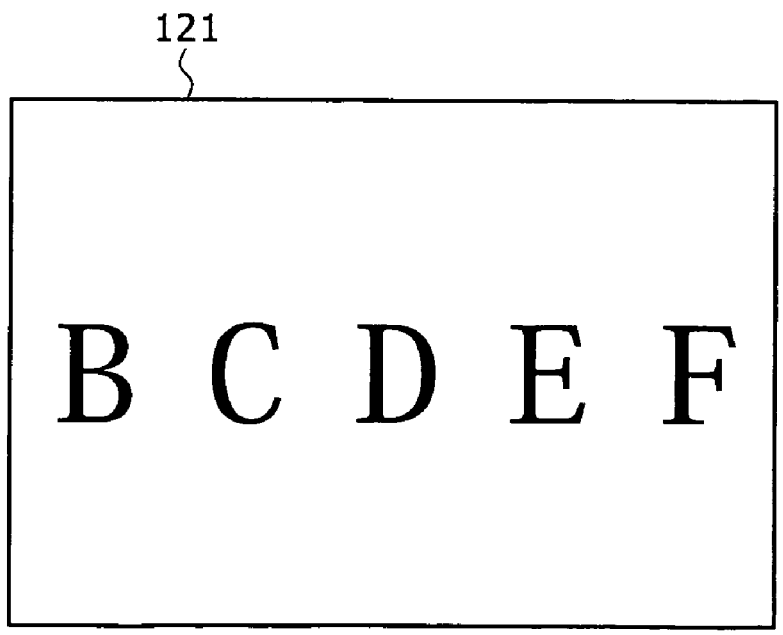

In FIG. 3A, an image 111 is one picked up from the entire photoreceptor surface of the CCD 11a. When the zoom ratio N for digital zoom is larger than 1, for instance, a block surrounded with a broken line in the figure is assumed as a necessary area 112, and interpolation processing is carried out with pixel signals for the necessary area 112, so that an enlarged area 121 as shown in FIG. 3B is obtained.

Because of the digital zoom function as described above, in the CCD 11a, of the pixels not included in the necessary area 112, pixel signals for pixels along the lines included in an area 113b above an image surface are transferred at a high speed during a vertical blanking period and aborted. Then, during a vertical effective period, pixel signals for the lines in the area 113a including the necessary area 112 are intermittently transferred at a speed of 1/N against the horizontal synchronism and are supplied to the AFE processing circuit 12. Then during a vertical blanking period, pixel signals for lines included in the area 113c are transferred at a high speed and are aborted.

Of the pixel signals for the lines within the area 113a outputted from the CCD 11a, those for pixels included in the unnecessary areas 114b and 114c in the horizontal direction are aborted by the zoom interpolating section 13b in the camera signal processing circuit 13, and only pixel signals for pixels included in the area 114a are regarded as effective. With the pixel signals regarded as effective, signals for the enlarged image are generated by means of interpolation processing.

There is the possibility, however, in a register provided in the vertical transfer section 102 in the CCD 11a, that a defect due to a potential gap may be present, and when an electric charge from the photoreceptor section 101 is accumulated for a long time, a pixel at a position corresponding to the register becomes visible as a black point. In this embodiment, a position of the defective pixel as described above is stored as defective pixel information 16a in the EEPROM 16, and a signal for the defective pixel is corrected by a defect correcting section 13a in the camera signal processing circuit 13. In this step, the CCD 11a is driven at the timing described below and as shown in FIG. 4 so that the position of the defective pixel due to the cause described above will not change according to the zoom ratio N for digital zoom.

FIG. 4 is a timing chart showing the timing for driving the CCD 11a when the digital zoom function is used in an image pickup device according to this embodiment.

In the state just before the vertical drive (VD) signal goes into the L level, pixel signals for lines included in an unnecessary area (area 113c in FIG. 3) in a lower section of an image surface for the previous frame (or field) are being transferred at a high speed.

When the VD signal enters the L level (timing T101), the drive pulse generating circuit 21 supplies a drive pulse signal to the CCD 11a for draining all of electric charges therein. When all of the electric charge accumulated therein is read out (timing T102), the operation for transferring the electric charge is terminated.

In this state, the high speed transfer reference value computing section 24 receives the number of lines included in the unnecessary area (area 113b in FIG. 3) above the image surface corresponding to the specified zoom ratio N from the control section 14, and computes a period of time (count number) required for high speed transfer. A transfer frequency in the high speed transfer is kept constant regardless of the zoom ratio N, so that the period of time required for high speed transfer can be computed based on the transfer frequency and the number of lines.

The high speed timing control section 23 computes backward the timing T103 for starting the high speed transfer based on the HD count number until the VD signal goes high (H level) and a count number computed by the high speed transfer reference value computing section 24, and outputs a pulse signal to the drive pulse generating circuit 21 at the timing T103. With this operation, the drive pulse generating circuit 21 supplies a drive pulse signal to the CCD 11a so that pixel signals for lines in the area 113b are transferred at a high speed, thus the high sped transfer being executed.

Then, a vertical effective period is started at the time point when high speed transfer of pixel signals for the area 113b is finished (timing T104). In this step, the intermittent transfer timing control section 22 receives the number of lines included in the necessary area (area 113a in FIG. 3) corresponding to the zoom ratio N from the control section 14, and gives a pulse indicating the synchronous timing for intermittent transfer to the drive pulse generating circuit 21. With this operation, the drive pulse generating circuit 21 gives a drive pulse signal for intermittent transfer to the CCD 11a, and pixel signals for lines in the necessary area are read out at the speed of 1/N against the horizontal synchronism.

Although not shown, when the vertical effective period comes to the end, electric charges for the unnecessary area under the image surface (area 113c) are transferred at a high speed for draining. With this operation, the processing for transferring image signals for one frame (or one field) is finished.

In the drive control as described above, during the transfer suspended period (from timing T102 to timing T103), if a defect due to a potential gap is present in the vertical transfer section 102, a pixel at the position becomes defective. However, the transfer suspended period is effected after all of electric charges are read out, and intermittent transfer of pixel signals for the necessary area is carried out just after the transfer suspended period, and therefore even if the zoom ratio N for digital zoom is changed, the position of the defective pixel due to the cause described above does not change.

Because of the configuration as described above, it is possible to previously store a position of a defective pixel due to the cause described above in defective pixel information 16a and to correct the defective pixel due to the cause with the defect correcting section 13a based on the information. In the method of correcting a defective pixel as described above, it is not necessary to detect a defective pixel due to the cause described above each time image pickup is performed, and correction can be carried out without the need of using any specific operation for detection of a defective pixel, and therefore when the defect correction method is available for actual purposes, the zoom function ensuring a high image quality can be realized at a low cost without using any optical means.

Second Embodiment

Figure 5:
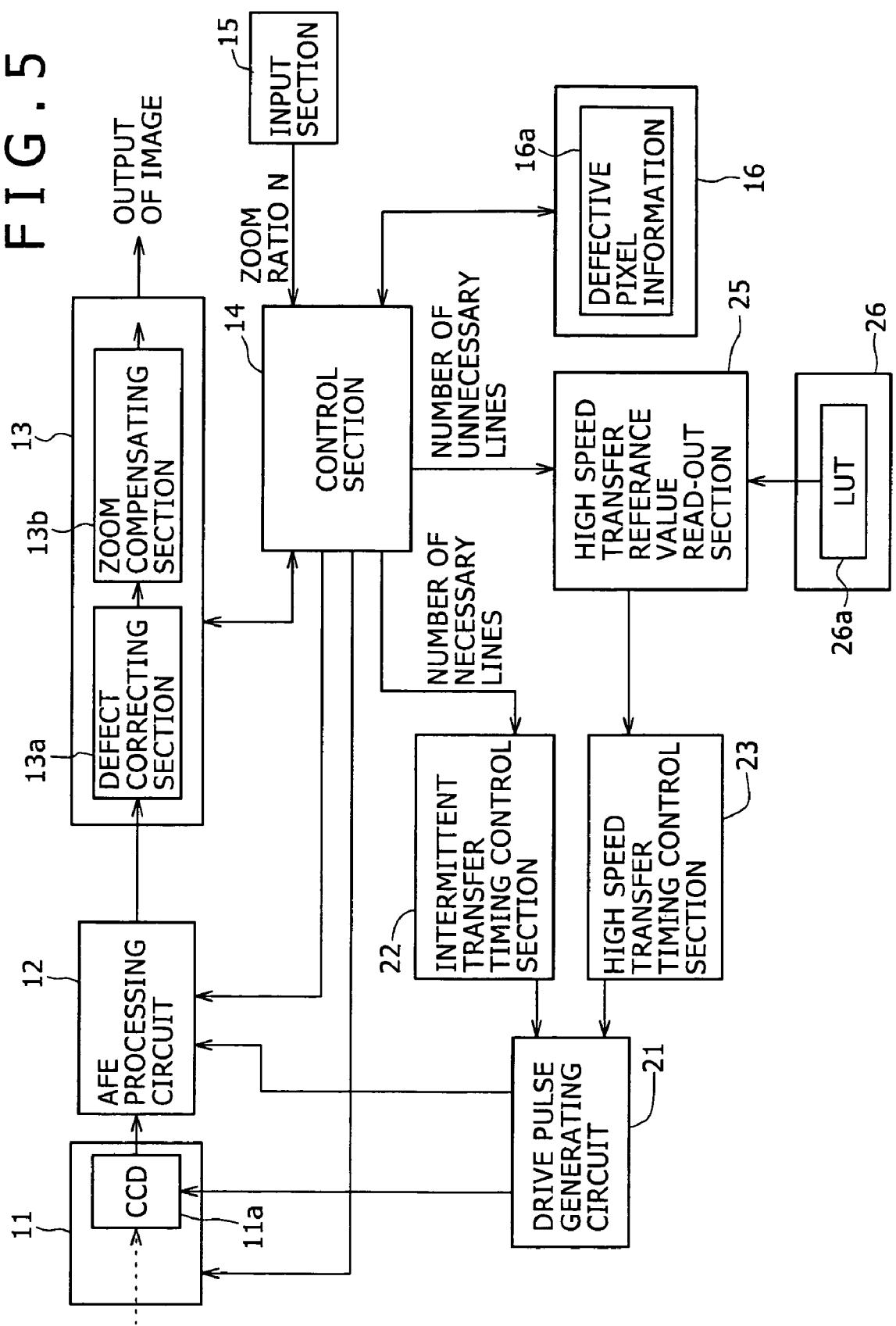
FIG. 5 is a block diagram showing configuration of a key section of an image pickup device according to a second embodiment of the present invention.

FIG. 5 is a block diagram showing configuration of a key section of an image pickup device according to a second embodiment of the present invention.

A difference of the image pickup device shown in FIG. 5 from that shown in FIG. 1 is the point that a high speed reference value read section 25 is provided in place of the high speed transfer reference value computing section 24. A ROM 26 is connected to the high speed reference value read section 25, and a look-up table (LUT) 26a with necessary time data for high speed transfer according to each zoom ratio N in digital zoom provided therein is stored in the ROM 26.

For instance, when the zoom ratio N for digital zoom can be set to five values, namely 1 time, 1.2 times, 1.5 times, 2 times, and 3 times, periods required for transferring pixels signals for unnecessary areas with respective zoom ratios are previously computed as count numbers against the horizontal synchronism respectively from the number of lines in unnecessary areas (area 113b in FIG. 3) corresponding to the respective zoom ratios N and are stored in the LUT 26a in correspondence to the zoom ratios N.

When the digital zoom function is actuated, the high speed reference value read section 25 receives the number of lines in an unnecessary area corresponding to each zoom ratio N from the control section 14, reads out the count number corresponding to the number of lines by referring to the LUT 26a, and sends the count number to the high speed timing control section 23. With this operation, the CCD 11a is driven according to the timing as shown in FIG. 4.

In the second embodiment of the present invention, the timing for starting high speed transfer of signal charges for an unnecessary area can be obtained only by reading out the time information previously stored in the LUT 26a, so that a work load required for the processing can be reduced. Further the function of the high speed reference value read section 25 may be realized with the control section 14.

Third Embodiment

Figure 6:
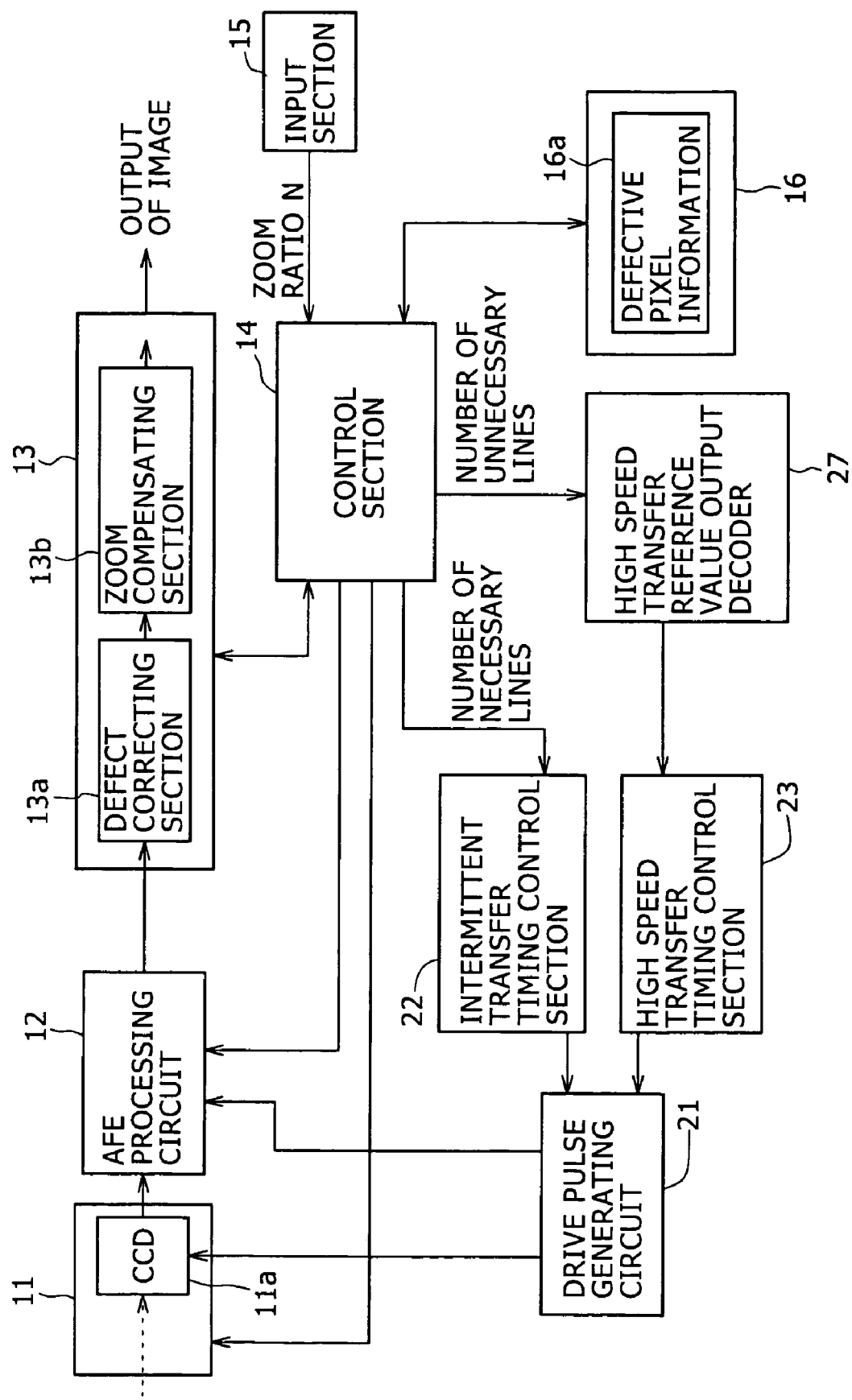
FIG. 6 is a block diagram showing configuration of a key section of an image pickup device according to a third embodiment of the present invention.

FIG. 6 is a block diagram showing configuration of a key section of an image pickup device according to a third embodiment of the present invention.

A difference of the image pickup device shown in FIG. 6 from that shown in FIG. 1 is that a high speed transfer reference value output decoder 27 is provided in place of the high speed transfer reference value computing section 24. The high speed transfer reference value output decoder 27 includes a hardware logic circuit, and, when the number of lines in an unnecessary area corresponding to a specified zoom ratio N is supplied from the control section 14, decodes the number of lines, and outputs the time information (count number) required for high speed transfer of electric charges for the unnecessary area to the high speed timing control section 23. With this operation, the CCD 11a is driven according to the timing as shown in FIG. 4.

As described above, with the configuration in which time information required for high speed transfer is outputted by decoding related data with the hardware logic circuit, the circuit scale can be reduced more as compared to a case in which the information is computed by the computing circuit as shown in FIG. 1, or a case in which the ROM 26 with the LUT 26a stored therein is provided as shown in FIG. 5.

Fourth Embodiment

Figure 7:
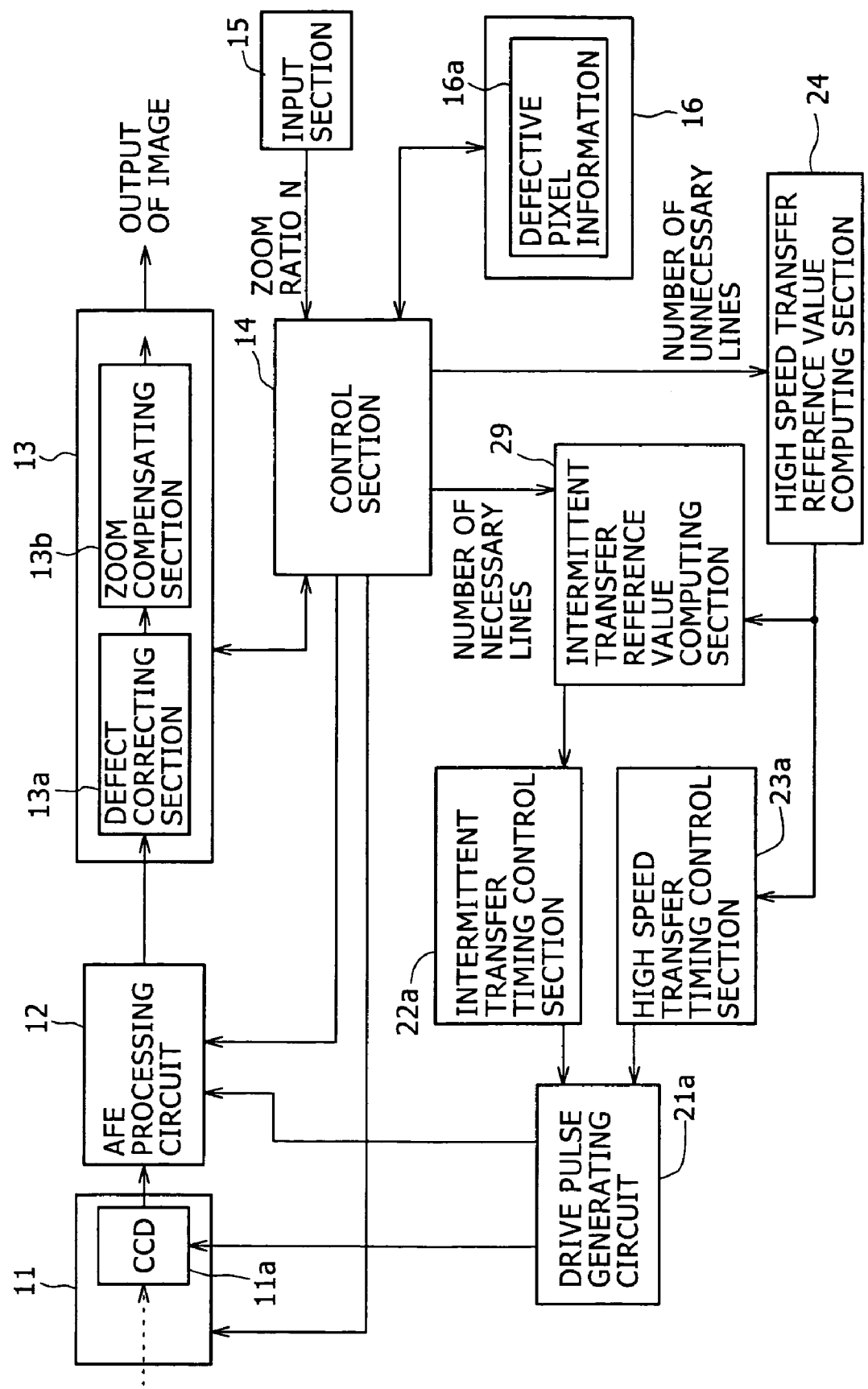
FIG. 7 is a block diagram showing configuration of a key section of an image pickup device according to a fourth embodiment of the present invention.

FIG. 7 is a block diagram showing configuration of a key section of an image pickup device according to a fourth embodiment of the present invention.

Figure 8:
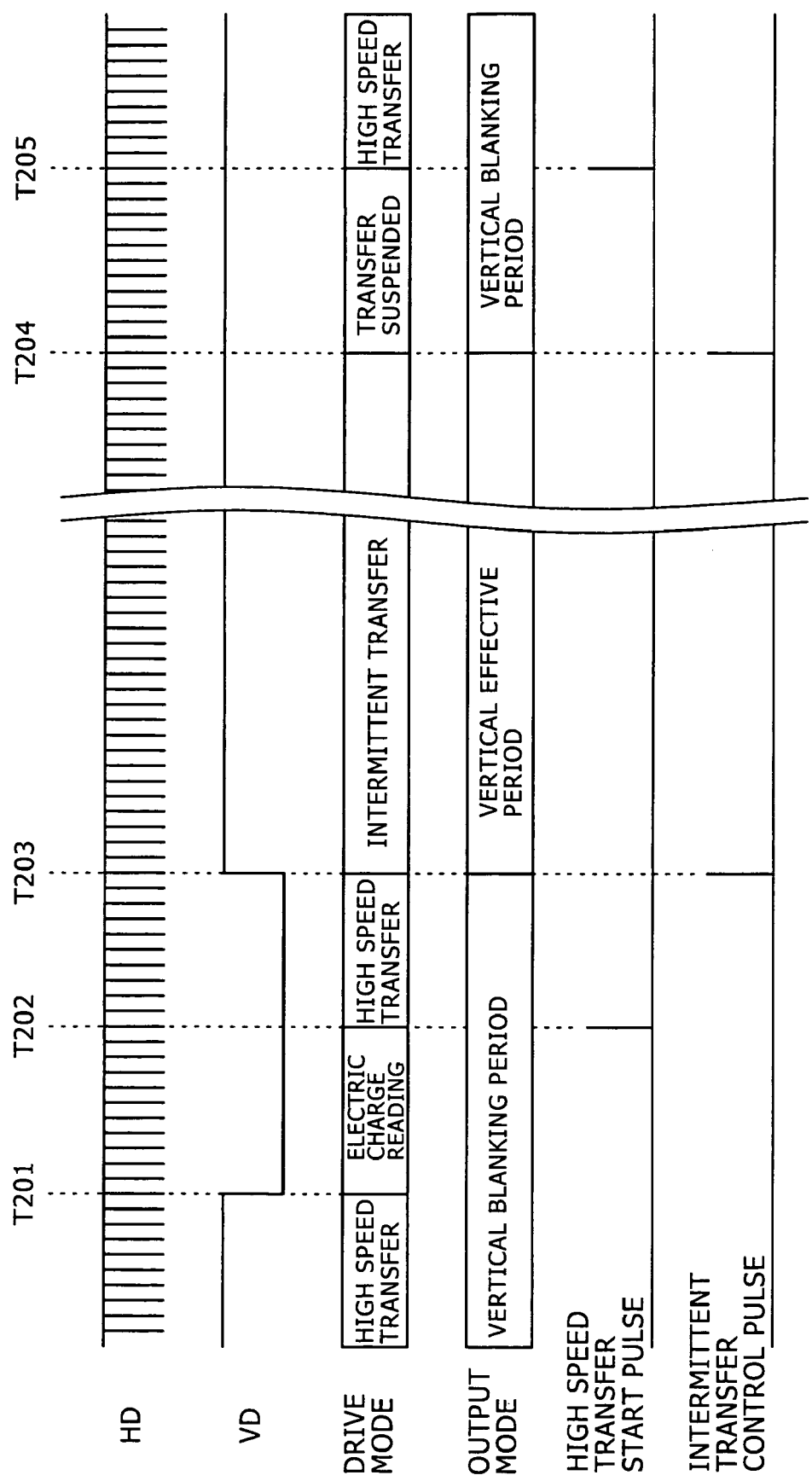
FIG. 8 is a timing chart showing the timing for driving the CCD when the digital zoom function is employed in the image pickup device according to the fourth embodiment of the present invention.
Figure 9:
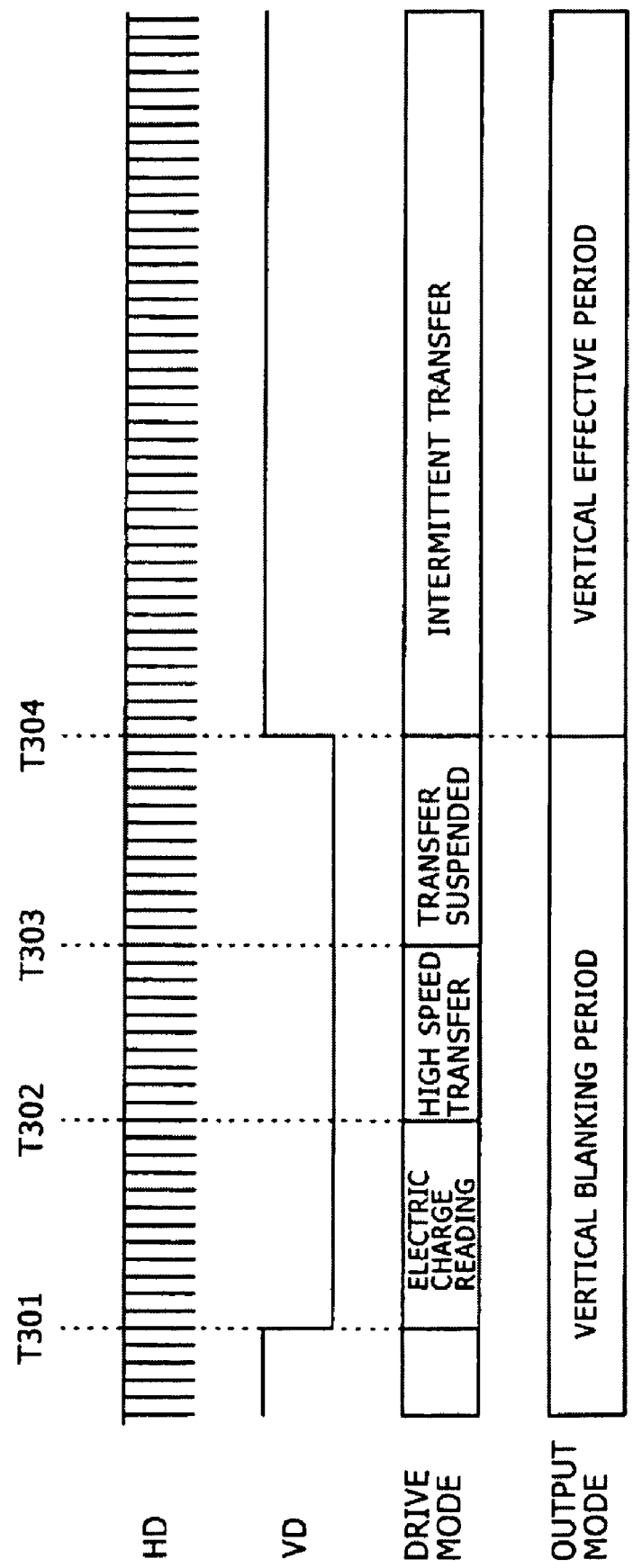
FIG. 9 is a timing chart showing the timing for driving the CCD in the conventional method of realizing the zoom function without using any optical means.

In the image pickup device according to this embodiment, as shown in FIG. 8 described hereinafter, a transfer suspended period in the CCD 11a is provided after the end of a vertical effective period. With this configuration, as the vertical effective period shifts according to a specified zoom ratio N for digital zoom as shown in FIG. 7, the configuration for generating a pulse for driving the CCD 11a is different from that shown in FIG. 1.

In FIG. 7, the high speed transfer reference value computing section 24 receives, like the case shown in FIG. 1, the number of lines in an unnecessary area corresponding to a specified zoom ratio N from the control section 14, and computes a required period of time for transferring pixel signals for the unnecessary area at a high speed as the count number of horizontal synchronism. The computed count number is supplied to both the high speed transfer timing control section 23a and the intermittent transfer reference value computing section 29.

The high speed transfer timing control section 23a outputs a pulse indicating the timing for starting high speed transfer of pixel signals for unnecessary areas above and under the image surface based on the count number from the high speed transfer reference value computing section 24 to the drive pulse generating circuit 21a. In this step, high speed transfer of pixel signals for the unnecessary area above the image surface is started just after the all electric charges are read out from the CCD 11a, and also high speed transfer of pixel signals for the unnecessary area under the surface image for the preceding frame (or field) is carried out just before reading of the all electric charge is started.

The intermittent transfer reference computing section 29 receives the number of lines for a necessary area corresponding to a zoom ratio N from the control section 14, receives the computed count number from the high speed transfer reference value computing section 24, computes the count number as a reference for start timing and end timing for intermittent transfer of pixel signals for a necessary area, and outputs the count number to the intermittent transfer timing control section 22a.

The intermittent transfer timing control section 22a outputs pulses indicating timing for starting and finishing the intermittent transfer of pixel signals for lines in the necessary area based on the count number from the intermittent transfer reference computing section 29. In this step, a period for carrying out the intermittent transfer is shifted from that shown in FIG. 1.

The drive pulse generating circuit 21a outputs various types of drive pulses for driving the CCD 11a according to the output pulses from the intermittent transfer timing control section 22a and the high speed transfer timing control section 23a.

FIG. 8 is a timing chart showing the timing for driving the CCD 11a when the digital zoom function is used in the image pickup device according to the present invention.

In this embodiment, for instance, when the VD signals goes low (L level) (at the timing T201), the timing for starting reading out all of the electric charges is given. After all electric charges have been read out (timing T202), high speed transfer of pixel signals for lines included in an unnecessary area above the image surface is started. The timing for starting high speed transfer is given as an output pulse from the high speed transfer timing control section 23a. Further when the high speed transfer is finished (timing T203), intermittent transfer of pixel signals for lines included in the necessary area is started.

Because the time required for high speed transfer changes in response to a zoom ratio N for digital zoom, the intermittent transfer reference computing section 29 receives time information required for high speed transfer from the high speed transfer reference value computing section 24, computes the time information as a reference for the timing for starting and finishing the intermittent transfer of pixel signals for the necessary area, and outputs the time information to the high speed transfer timing control section 23*a*. For instance, the intermittent transfer reference computing section 29 computes the count number of horizontal synchronism for computing the timing for starting intermittent transfer and also timing for finishing the intermittent transfer by referring the timing T201 when the VD signal goes low as the reference.

The intermittent transfer timing control section 22*a* notifies the drive pulse generating circuit 21*a* of a transfer frequency corresponding to the number of lines in the necessary area. Further the intermittent transfer timing control section 22*a* may output a synchronous pulse for the transfer frequency to the drive pulse generating circuit 21*a*. With the controls as described above, intermittent transfer of pixel signals for the necessary area is executed after high speed transfer of pixel signals for the unnecessary area above the image surface is executed in the CCD 11*a* according to the drive pulse outputted from the drive pulse generating circuit 21*a*.

When the intermittent transfer is finished (timing T204), the vertical blanking period is effected with transfer in the CCD 11*a* suspended, and further at the timing T205, high speed of pixel signals for lines included in the unnecessary area under the image surface is started. The start timing is given when a pulse from the high speed transfer timing control section 23*a* is outputted based on the count number computed by high speed transfer reference value computing section 24 by referring, for instance, to the timing when the VD signal goes low (L level) next.

Although not shown, when the high speed transfer of pixel signals for the unnecessary area under the image surface is finished, reading of all electric charges is again started, and then high speed transfer of pixel signals for the unnecessary area above the image surface for the next frame (or field) is started.

With the drive control as described above, because the intermittent transfer of pixel signals for a necessary area is carried out just after a period of high speed transfer of pixel signals for the unnecessary area above the image surface is finished, even when there is a defect due to a potential gap in the vertical transfer section 102, a position of the defective pixel does not change according to a zoom ratio N for digital zoom, so that a defective pixel due to the cause described above can be corrected by the defect position correcting section 13*a* based on the positional information for the defective pixel previously stored in the defective pixel information 16*a*.

Further the transfer suspended period is provided after intermittent transfer and all electric charge is read out after this period and pixel signals for the next frame (or field) are read out, whereby there is provided the effect that a signal from a defective pixel due to the cause described above is seldom mixed in output image signals.

In the example of drive control described above, a transfer suspended period if provided after the intermittent transfer, but also the configuration is allowable in which high speed transfer of pixel signals for an unnecessary area under the image surface is performed just after the intermittent transfer and then transfer of pixel signals is suspended until the VD signal goes low (L level).

In the embodiments described above, time information (count number) outputted from the high speed transfer reference value computing section 24 and intermittent transfer reference computing section 29 is computed each time a zoom ratio N for digital zoom is specified, but also the configuration is allowable in which a lookup table with count numbers corresponding to various zoom ratios N respectively stored therein and a corresponding value is read out when a specific zoom ratio N is specified. Further the configuration is allowable in which the count number is decoded each time a zoom ratio N is specified with a decode circuit including a hardware logic circuit.

As described above, the present invention may be applied not only to the image pickup function used in a digital still camera and a digital video camera each recording a still image or a video image as digital data, and to a portable information processor such as a mobile telephone and a PDA, but also to a TV telephone, a personal computer, a compact camera for a computer game and the like. Especially, the present invention can advantageously be applied to a compact and thin image pickup device in which it is hard to provide an optical zoom function such as a portable image processor or a compact camera.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup device realizing a zoom function by enlarging a portion of an image picked up with a solid-state imaging device comprising:
    a zoom ratio accepting unit configured to accept an input with a zoom ratio of N (N·1);
    a computing unit configured to compute, based on a number of horizontal lines in an unnecessary area in a image surface corresponding to said zoom ratio N from said zoom ratio accepting unit as well as on a transfer frequency when transferring signal charges for said horizontal lines at a high speed, a period of time required for high speed transferring pixel signals for said horizontal lines, wherein the transfer frequency in the high speed transfer is kept constant regardless of the zoom ratio N;
    a timing signal generating unit configured to generate timing for driving the solid-state imaging device so that signal charges for the horizontal lines included in a required area for said zoom ratio of N among the horizontal lines on an acceptance surface of said solid-state imaging device are intermittently transferred once for N horizontal scan periods within a vertical effective period and signal charges for the horizontal lines included in an upper unnecessary area corresponding to an section above the image surface from the necessary area are transferred at a high speed just before the vertical effective period, wherein said timing signal generating unit generates timing for starting high speed transfer based on a result of computing by said computing unit.

2. The image pickup device according to claim 1 further comprising,
    a storage unit configured to previously store therein a period of time required for high speed transferring signal charges for horizontal lines in said unnecessary area above the image surface, wherein said timing signal generating unit generating the timing for starting high speed transfer based on information corresponding to said zoom ratio N from said zoom ratio accepting unit and stored in said storage unit.

3. The image pickup device according to claim 1 further comprising,
a decoding unit including a hardware logic circuit configured to decode and output, based on a number of horizontal lines in said unnecessary area above the image surface corresponding to said zoom ratio N from said zoom ratio accepting unit, a period of time required for high speed transferring of signal charges for said horizontal lines,
wherein said timing signal generating unit generates the timing for starting high speed transfer based on a result of decoding by said decoding unit.

4. The image pickup device according to claim 1,
wherein said timing signal generating unit further generates said drive timing so that all electric charge accumulated in said solid-state imaging device is drained, within a vertical blanking period, just before signal charges for the horizontal lines included in said unnecessary area above the image surface are transferred at a high speed.

5. The image pickup device according to claim 4 further comprising,
a computing unit configured to compute a reference period of time for giving the timings for starting and terminating the intermittent transfer period for signal charges for the horizontal lines included in said necessary area, on the basis of the time corresponding to said zoom ratio N required for high speed transferring of the signal charges in said horizontal lines included in said unnecessary area,
wherein said timing signal generating unit generates the timings for starting and terminating said intermittent transfer period based on a result of computing by said computing unit.

6. The image pickup device according to claim 4 further comprising,
a storage unit configured to previously store a reference period of time for each of said zoom ratios N for giving the timings for starting and terminating the intermittent transfer period for signal charges for the horizontal lines included in said necessary area,
wherein said timing signal generating unit generates the timings for starting and terminating the intermittent transfer period based on the information corresponding to said zoom ratio N from said zoom ratio accepting unit and stored in said storage unit.

7. The image pickup device according to 4 further comprising,
a decoding unit comprising a hardware logic circuit configured to decode and output, based on the period of time corresponding to the period of time corresponding to said zoom ratio N required for high speed transfer of signal charges for horizontal lines in said unnecessary area above the image surface, a reference period of time for giving timings for starting and terminating intermittent transfer of signal charges for horizontal lines,
wherein said timing signal generating unit generates the timings for starting and terminating the intermittent transfer based on a result of decoding by said decoding unit.

8. A driving controlling method for a solid-state imaging device for realizing the zoom function by enlarging a portion of an image picked up with a solid-state imaging device, comprising steps of:
accepting a zoom ratio N (N·1);
computing, based on a number of horizontal lines in an unnecessary area in a image surface corresponding to said zoom ratio N from said zoom ratio accepting unit as well as on a transfer frequency when transferring signal charges for said horizontal lines at a high speed, a period of time required for high speed transferring pixel signals for said horizontal lines, wherein the transfer frequency in the high speed transfer is kept constant regardless of the zoom ratio N;
generating the timing for driving said solid-state imaging device so that signal charges for the horizontal lines included in a necessary area corresponding to said zoom ratio N among the the horizontal lines on acceptance surface of said solid-state imaging device are transferred intermittently once for N horizontal scan periods within a vertical effective period, and signal charges for the horizontal lines included in an unnecessary area upper from said necessary area and above the image surface are drained by transferring at a high speed just before the vertical effective period, wherein said timing signal generating unit generates timing for starting high speed transfer based on a result of computing by said computing unit.

9. An image pickup device realizing a zoom function by enlarging a portion of an image picked up with a solid-state imaging device comprising:
a zoom ratio accepting unit for accepting an input with a zoom ratio of N (N·1);
a computing unit for computing, based on a number of horizontal lines in an unnecessary area in a image surface corresponding to said zoom ratio N from said zoom ratio accepting unit as well as on a transfer frequency when transferring signal charges for said horizontal lines at a high speed, a period of time required for high speed transferring pixel signals for said horizontal lines, wherein the transfer frequency is the high speed transfer is kept constant regardless of the zoom ratio N; and
a timing signal generating unit for generating timing for driving the solid-state imaging device so that signal charges for the horizontal lines included in a required area for said zoom ratio of N among the horizontal lines on an acceptance surface of said solid-state imaging device are intermittently transferred once for N horizontal scan periods within a vertical effective period and signal charges for the horizontal lines included in an upper unnecessary area corresponding to an section above the image surface from the necessary area are transferred at a high speed just before the vertical effective period, wherein said timing signal generating unit generates timing for starting high speed transfer based on a result of computing by said computing unit.

10. The image pickup device according to claim 9,
wherein said timing signal generating unit further generates said drive timing so that all electric charge accumulated in said solid-state imaging device is drained, within a vertical blanking period, just before signal charges for the horizontal lines included in said unnecessary area above the image surface are transferred at a high speed.

* * * * *